United States Patent Office  3,469,498
Patented Sept. 30, 1969

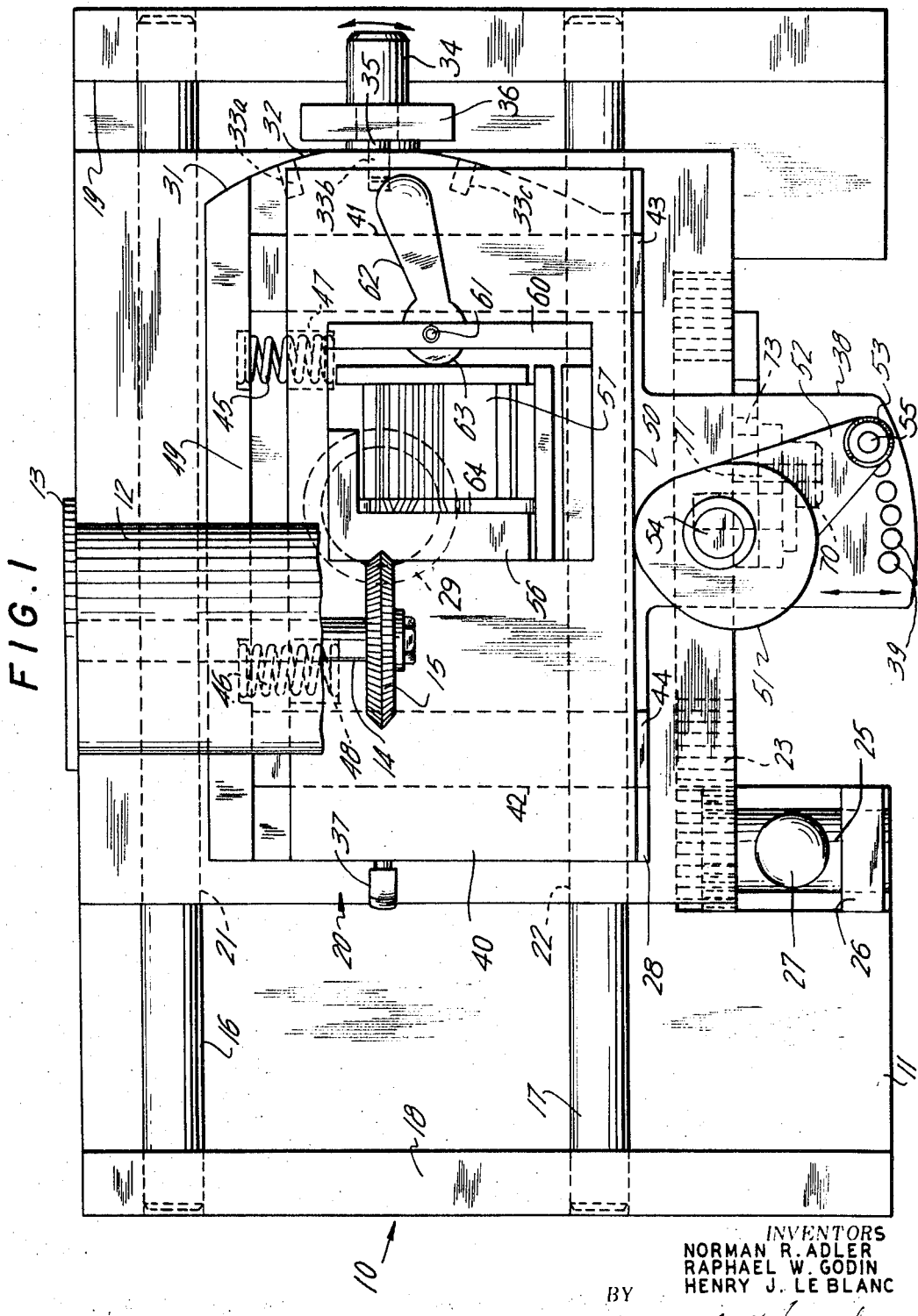

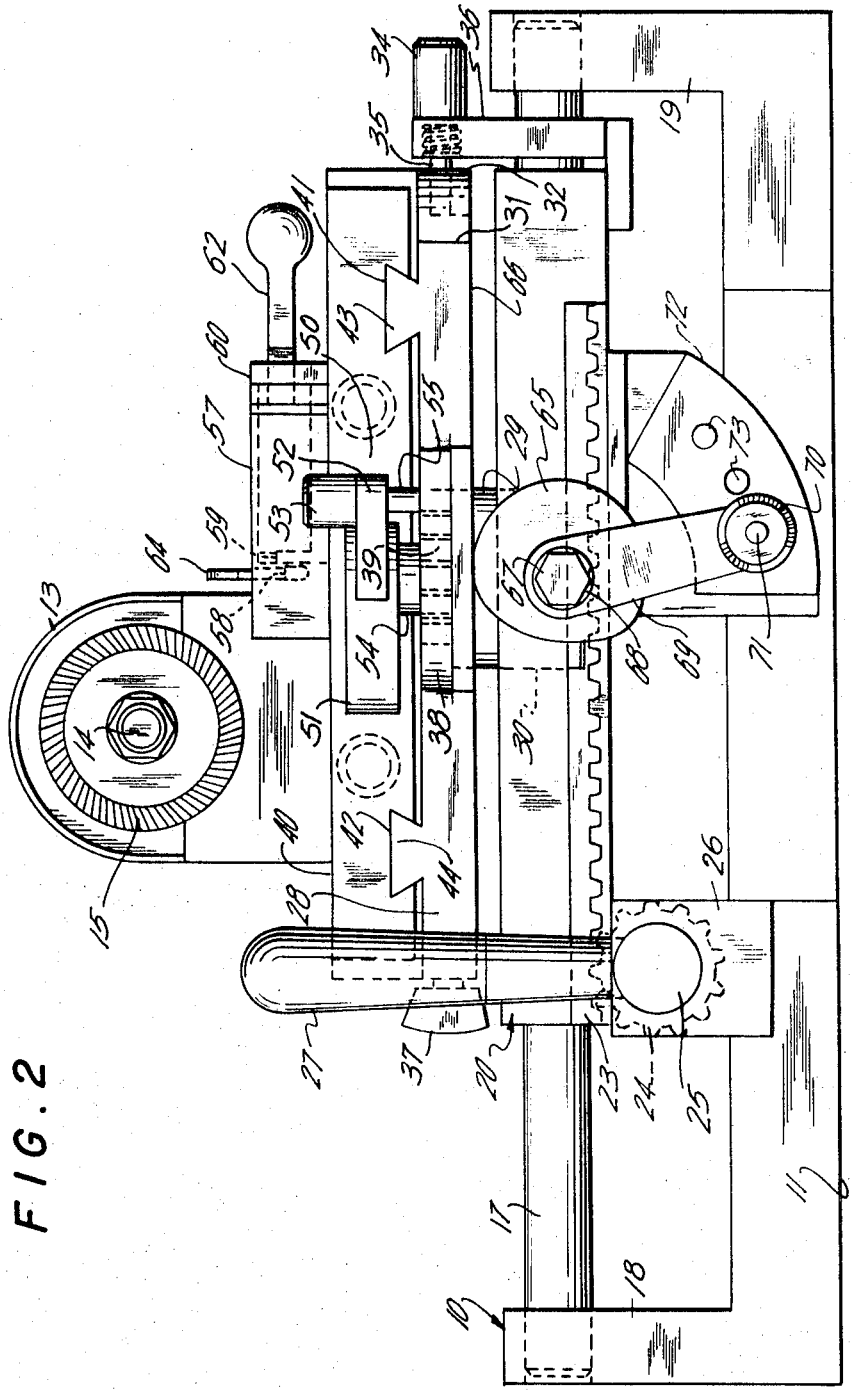

3,469,498
CODE KEY CUTTER DEVICE
Norman R. Adler, Fitchburg, Raphael W. Godin, Leominster, and Henry J. Le Blanc, Fitchburg, Mass., assignors to Ilco Corporation, Fitchburg, Mass., a corporation of Massachusetts
Continuation-in-part of applications Ser. No. 663,024 and Ser. No. 663,083, Aug. 24, 1967. This application Aug. 24, 1967, Ser. No. 663,094
Int. Cl. B23c 1/16
U.S. Cl. 90—13.05       6 Claims

ABSTRACT OF THE DISCLOSURE

A code key cutter for forming cuts of different heightwise extents, said cutter, in addition, being capable of forming the cuts at an angle as respects the plane described by the key blank itself.

CROSS REFERENCES

This application is a continuation in part of our application filed on even date herewith and entitled, Key Cutter Device, application Ser. No. 663,083 and Plunge Actuated Cutter for Keys Having Angularly Directed Bits, application Ser. No. 663,024.

BACKGROUND

Field of the invention

This invention is in the field of key duplication, and more particularly in the field of forming a cut key from a key blank by a code key cutting machine not requiring the presence of a pattern key.

Description of the prior art

Various key cutting machines are known. Such known key cutting machines operate on one of two principles, namely, a tracing principle wherein a pattern key is traced by a stylus and complemental cuts in accordance with the traced formation are formed in a key blank by a cutter which moves with the stylus.

In the second known type of cutter, heightwise adjustment and spacing of the cuts are effected by indexing means which position the cutter and the key blank clamp in accordance with a code, so that if the code of the pattern key to be duplicated is known, the key may be duplicated without the actual presence of the pattern key.

Certain types of locks heretofore known operate on principles which require the bitting of the key to be disposed at an angle with respect to the plane described by the key blank. Heretofore it has been necessary to hand file such keys or to reproduce the same in the factory by the use of specialized manufacturing equipment. Field duplication has been essentially impossible and the difficulty of obtaining replacement keys without recourse to the factory has, in large measure, circumscribed the market for lock mechanisms requiring such keys.

SUMMARY OF THE INVENTION

A key cutting machine for cutting keys and particularly keys having bits cut at an angle to the longitudinal axis of the key, including a frame, a carriage mounted for sliding movement on the frame, a table pivotally and heightwisely adjusted with respect to the carriage, clamp means on the table and means for pivoting the table to a series of angled positions with respect to a cutter wheel corresponding to the angles of the bits to be formed, whereby a key supported in the clamp may be set at a predetermined series of angles with respect to the cutter wheel, the apparatus including means for shifting the key in the clamp transversely across the path of the cutter wheel to form a desired cut.

It is accordingly an object of the invention to provide a code key cutter for forming angled cuts in a key blank in accordance with a predetermined code.

A further object of the invention is the provision of the device described which is largely automatic and foolproof in its operation and wherein the various adjusted positions may be effected by indexing mechanisms to provide readily shifted settings.

To attain these objects and such further objects as may appear herein or be hereinafter pointed out, reference is made to the accompanying drawing, forming a part hereof, in which:

FIGURE 1 is a plan view of a cutter device in accordance with the invention;

FIGURE 2 is a front elevational view thereof.

In accordance with the invention, 10 is a frame having a base portion 11 which may be mounted on a suitable work-bench or table. A motor 12 is mounted to the frame, as by bracket 13, so that the motor is fixed to the frame.

To the motor shaft 14 there is mounted the usual cutter wheel 15.

The frame is provided with a pair of transversely extending slide rods 16, 17 mounted within opposed rod receiver sockets formed in the side walls 18, 19 of the frame, the rods 16, 17 being parallel with each other and perpendicular to the motor shaft 14.

A carriage 20 is mounted on the rods 16, 17 for transverse movement with respect thereto, the carriage being provided with slide bores 21, 22 for such purpose. The carriage, at its forward end, is provided with a downwardly directed rack portion 23, the teeth of the rack meshing with pinion gear 24. The pinion gear 24 is fixed to a trunnion 25 journalled in an upstanding flange 26 carried by the frame 10, an operator handle 27 being mounted on the shaft. It will be evident that by counterclockwise and clockwise movements of the handle 27, the carriage will be shifted laterally along the rods 16, 17.

A support table 28 is mounted to the carriage 20 for both vertical and pivotal movement with respect to the carriage, said vertical and pivotal movement being accommodated by a vertically directed trunnion 29 forming a close fit through bearing aperture 30 formed in the table.

The table 28 is permitted a range of pivotal movement about the axis defined by the trunnion 29. For this purpose, there is formed on an end 31 of the table an arcuate portion 32 having three spaced-apart detent apertures 33a, 33b, 33c.

A spring biased detent 34, having a plunger 35, is mounted to a vertically directed standard 36 welded or otherwise fastened to and forming an extension of the carriage 20. It will be evident that the pivoted relation of the table to the carriage may be varied by pulling the detent 34 to release plunger 35 and pivoting the carriage with the aid of knob 37 until plunger 35 is aligned with the desired detent aperture.

To facilitate setting the pivot angle, indicia (not shown) may be marked on the table adjacent the detent seats 33a, 33b, 33c. The table is provided with an extension or offset member 38 having a series of spaced-apart apertures 39 formed therein, which apertures define detent seats used to advance the key for spacing the formation of progressive key cuts.

The apertures 39 may, like the apertures 33a, 33b, 33c, be provided with indicia means for indicating by sequence the number of the cut to be formed.

A key clamp platform 40 is mounted on the table 28 for inward and outward movement. The platform 40 is provided with a spaced pair of dove-tailed slots 41, 42, which mate with raised dove-tail portions 43, 44, respectively, extending from the table 28 to assure parallel movement of the platform 40 with respect to the table 28. The platform is urged forwardly or toward the extension portion 38 by a pair of coil springs 45, 46 which are compressed between spring seats 47, 48 on the platform 40 and opposed seats formed on an upstanding retainer ledge 49 of the table.

The springs 45, 46 bias the front edge 50 of the platform against a length locator cam 51 which functions, with the index apertures 39, lengthwisely to orient a clamped key with respect to the cutter 15.

The cam 51 includes an integral locator arm 52 having a spring pressed detent 53 carried thereon for vertical movement. The cam 51 also includes a depending shaft 54 mounted within a suitable bearing aperture (not shown) formed in the table extension portion 38. A depending plunger pin 55 extends yieldably below the arm 52 and below the level of the detents 39 to lock the pin 55 in a selected one of the detents.

It will be evident that a rotation of the cam 51 by rotation of the pivot shaft 54 will cause portions of the cam surface which are disparate differences from the axis of rotation to be disposed in engagement with the front face 50 of the table, accordingly inducing in the table the desired front and back movement in accordance with the position of the detent. The front and back movement will be accomplished against the pressure of the springs 45, 46 which maintain the platform 40 against the surface of cam 51.

The platform 40 carries a key clamp mechanism which may be of the conventional wing nut operated vise type but, in the illustrated embodiment, comprises a wedge cam operated vise. The vise includes a fixed jaw 56 and a moving jaw 57. The fixed jaw includes a horizontal support surface 58, FIGURE 2, on which the blade of the key is mounted, the seat being recessed at the forward end (not shown) in such manner as to provide clearance therebeneath for the bow or head of the key.

The movable jaw 57, which is mounted for slidable movement toward and away from the fixed jaw, includes a compression ledge 59 disposed at a position above the seat 58. A vertically extending flange 60 is spaced from the movable jaw 57 and carries about vertical pivot 61 a vise operator lever 62. The lever, which is pivotally mounted, incorporates a compression cam 63 at its inner end, the end of which cam bears against the movable jaw 57. A key blank 64 to be cut is inserted between the jaws 56, 57 with the blade of the key supported on the ledge 58. When the lever 62 is operated in a clockwise direction, jaw 57 will be cammed toward jaw 56, clamping the key blank between the aforementioned jaws.

In order to effect heightwise adjustment of the key blank in respect to the cutter, means are provided for lifting the table 28 and, consequently, the platform 40. For this purpose there is provided a lift cam 65 which engages against under-surface 66 of the table 28. The left cam 65 is clamped by bolt 67 to a bearing shaft 68 journalled in the carriage 20. An adjustment lever 69 is clamped by the bolt 67 to the cam, the lever being provided with a detent operator plunger 70 having a retractable detent pin 71 extending inwardly therefrom.

A quadrant bracket 72 fixed to the carriage includes three detent apertures 73, it being understood that rotation of the lever 69 and disposition of the detent pin 71 in a selected one of the apertures 73 will rotate the cam 65 so as to dispose a different edge portion of the cam in contact with the undersurface 66 of the table 28, thereby to very the height of the table in accordance with the spacing of the edge portion of the cam from the axis of shaft 68.

The operation of the device will be readily understood from the foregoing description.

A key blank 64 is clamped in the vise through the operation of the lever handle 62, in a manner previously described. The operating lever 52 is positioned for the formation of the first cut by disposing the detent 53 in the desired aperture 39. The heightwise adjustment for determining the depth of the cut is effected by disposing the detent 71 through the operation of the detent plunger 70 in the proper aperture 73.

It will be understood that keys are normally coded in accordance with the height or depth of each specific cut and the aperture 73 will be comparably coded to enable this depth to be achieved.

Next, the detent 34 is set in one of the apertures 33a, 33b, 33c, depending upon the subsequent code, it being understood that when the detent is within the aperture 33b the cut will be formed normal to the plane of the blade of the key whereas when the detent is set in either of the apertures 33a or 33c, the cut will be formed at an angle as respects the plane of said blade.

When the settings for the first cut have been effected and with the cutter motor running, the handle 27 may be shifted counter-clockwisely, resulting in the carriage moving to the left or across the path of the cutter wheel 15, forming the first cut at the proper height, angle and lengthwise disposition with respect to the key blade. The handle is returned to its vertical position, clearing the key for movement to set the cut for the formation of the second bit.

In this connection, the detent 53 is advanced to the second detent aperture 39 and the heightwise adjusting lever 69 and angle adjusting detent 34 are again set in accordance with the code specified for the second cut. The handle 27 is again operated in the manner set forth and the second cut is formed.

Subsequent cuts are all formed in the manner set forth until the key blank has been completely cut in accordance with a specific code. At this point, the vise operating lever 62 is returned to the vise opening position thereof and the now completely cut key removed.

From the foregoing it will be evident that there is provided a code key cutter which may be used in the formation of keys wherein the bits are not only of varying heights but also of various angles as respects the body portion of the key.

It will be further appreciated that the device may easily be set to readily repeated positions, and is foolproof in operation.

Having thus described the invention and illustrated its use, what is claimed as new and is desired to be secured by Letters Patent is:

1. A code key cutter device for cutting keys having bittings formed at various angles to the longitudinal axis of the key, comprising a frame, a motor mounted on said frame including a depending cutter wheel, a slideway formed on said frame, a carriage mounted on said slideway for linear motion along a predetermined path relative to said cutter, a table mounted on said carriage for vertical and pivotal movement with respect thereto, first adjustment means interposed between said table and said carriage for varying the vertical spacing of said table from said carriage, second adjustment means engaging said table for locking said table in one of a series of pivoted positions with respect to said carriage, key clamp means on said table and means for shifting said carriage along said slideway in said linear path.

2. A device in accordance with claim 1 and including guide means interposed between said table and said key clamp means, said guide means permitting linear movement of said table and said key clamp means in a path normal to said linear path.

3. A device in accordance with claim 2 and including indexing means interposed between said key clamp means and said table for moving said key clamp means relative to said table along said guideway means.

4. A device in accordance with claim 3 wherein said guideway means is disposed in parallelism with the axis of rotation of said cutter wheel.

5. A device in accordance with claim 3 wherein said first and second adjustment means include indexing means.

6. A code key cutter for cutting keys having bittings formed at a variety of angles with respect to the key blank axis, comprising a support frame, key cutting motor means mounted on said frame, said motor means having a drive shaft carrying a cutter wheel, a key carrier platform mounted on said frame for transverse movement relative to the axis of rotation of said shaft, key clamp means mounted on said platform, and adjustment means interposed between said platform and frame for providing vertical, horizontal and pivotal adjustment of said platform relative to said cutter wheel.

References Cited
UNITED STATES PATENTS

| 749,598 | 1/1904 | West | 90—13.05 |
| 1,750,218 | 3/1930 | Falk | 90—13.05 |
| 1,752,668 | 4/1930 | Johnson | 90—13.05 |
| 1,803,428 | 5/1931 | Falk | 90—13.05 |
| 1,811,922 | 6/1931 | Falk | 90—13.05 |

GERALD A. DOST, Primary Examiner